US011234371B2

(12) United States Patent
Sorensen

(10) Patent No.: US 11,234,371 B2
(45) Date of Patent: Feb. 1, 2022

(54) TOOL-LESS FOLDING DIVIDER FOR COMBINE HEAD

(71) Applicant: CNH Industrial America LLC, New Holland, PA (US)

(72) Inventor: Douglas D. Sorensen, Lancaster, PA (US)

(73) Assignee: CNH Industrial America LLC, New Holland, PA (US)

( * ) Notice: Subject to any disclaimer, the term of this patent is extended or adjusted under 35 U.S.C. 154(b) by 224 days.

(21) Appl. No.: 16/534,320

(22) Filed: Aug. 7, 2019

(65) Prior Publication Data
US 2021/0037712 A1 Feb. 11, 2021

(51) Int. Cl.
| | |
|---|---|
| *A01D 63/04* | (2006.01) |
| *A01D 41/14* | (2006.01) |
| *A01D 45/02* | (2006.01) |
| *A01D 47/00* | (2006.01) |

(52) U.S. Cl.
CPC .............. *A01D 63/04* (2013.01); *A01D 41/14* (2013.01); *A01D 45/021* (2013.01); *A01D 47/00* (2013.01)

(58) Field of Classification Search
CPC ...... A01D 63/04; A01D 41/14; A01D 45/021; A01D 47/00; A01D 63/02; A01D 63/00
See application file for complete search history.

(56) References Cited

U.S. PATENT DOCUMENTS

| | | | | |
|---|---|---|---|---|
| 703,497 | A * | 7/1902 | Steward | A01D 63/04 56/319 |
| 1,008,283 | A | 11/1911 | Podlešák | |
| 2,209,047 | A * | 7/1940 | Berg | A01D 63/04 56/319 |

(Continued)

FOREIGN PATENT DOCUMENTS

| | | |
|---|---|---|
| DE | 119853 C | 4/1901 |
| DE | 7342482 U | 11/1973 |

(Continued)

OTHER PUBLICATIONS

International Search Report and Written Opinion for PCT Application No. PCT/US2020/045428, dated Nov. 23, 2020 (12 pages).

*Primary Examiner* — Arpad Fabian-Kovacs
(74) *Attorney, Agent, or Firm* — Peter Zacharias; Patrick Sheldrake

(57) ABSTRACT

A divider of a header for an agricultural vehicle including a divider body, a receiving member configured for being connected to the frame of the header, and an adjustable connector positionable in between an unfolded work position and a folded transport position. The adjustable connector includes a first member, a second member, and an articulating joint for pivotally connecting the first and second members. The first member mounts the divider body, the second member is slidably connected to and received within the receiving member, and the articulating joint is at least partially received within the receiving member in the unfolded work position such that the first and second mem- (Continued)

bers are substantially immobilized and the articulating joint is positioned outside of the receiving member in the folded transport position such that the first and second members are movable relative to one another.

20 Claims, 3 Drawing Sheets

(56) References Cited

U.S. PATENT DOCUMENTS

| | | | | |
|---|---|---|---|---|
| 2,895,757 | A * | 7/1959 | Kaspar | G05G 1/00 403/100 |
| 3,563,592 | A * | 2/1971 | Preston | E05C 17/32 292/263 |
| 3,585,790 | A * | 6/1971 | Kalkwarf | A01D 45/021 56/119 |
| 4,087,954 | A | 5/1978 | Reese, Sr. | |
| 4,446,682 | A * | 5/1984 | Jennen | A01D 45/021 56/119 |
| 4,538,404 | A * | 9/1985 | Heimark, Jr. | A01D 45/021 56/119 |
| 4,700,537 | A * | 10/1987 | Emmert | A01D 63/04 56/119 |
| 4,757,673 | A * | 7/1988 | Gayman | A01D 63/04 172/502 |
| 5,865,019 | A * | 2/1999 | Hurlburt | A01D 45/021 56/119 |
| 6,247,297 | B1 * | 6/2001 | Becker | A01D 45/021 56/119 |
| 6,513,313 | B1 * | 2/2003 | Bennett | A01D 45/021 56/119 |
| 6,598,381 | B2 | 7/2003 | Albinger et al. | |
| 6,715,273 | B2 | 4/2004 | Weichholdt et al. | |
| 7,051,503 | B2 | 5/2006 | Weichholdt | |
| 7,350,345 | B2 * | 4/2008 | Slabbinck | A01D 63/00 56/119 |
| 8,141,331 | B2 * | 3/2012 | Bich | A01D 63/04 56/15.2 |
| 8,387,352 | B2 * | 3/2013 | Silver | A01D 45/021 56/319 |
| 8,726,623 | B2 | 5/2014 | Kiel et al. | |
| 9,226,447 | B2 | 1/2016 | Noll et al. | |
| 9,253,944 | B2 * | 2/2016 | Hulstein | A01D 41/06 |
| 9,532,505 | B2 * | 1/2017 | Long | A01D 45/021 |
| 2002/0035826 | A1 * | 3/2002 | Albinger | A01D 41/144 56/109 |
| 2003/0056482 | A1 * | 3/2003 | Weichholdt | A01D 63/04 56/314 |
| 2003/0226342 | A1 * | 12/2003 | Boeckmann | A01D 41/144 56/14.7 |
| 2004/0244352 | A1 * | 12/2004 | Weichholdt | A01D 63/04 56/314 |
| 2007/0193242 | A1 * | 8/2007 | Kost | A01D 45/021 56/119 |
| 2009/0025354 | A1 * | 1/2009 | Guldenpfennig | A01D 45/021 56/119 |
| 2012/0042624 | A1 * | 2/2012 | Lohrentz | A01D 45/021 56/119 |
| 2014/0083074 | A1 * | 3/2014 | Kiel | A01B 73/00 56/119 |
| 2014/0260165 | A1 * | 9/2014 | Lohrentz | A01D 63/00 56/119 |
| 2015/0121831 | A1 | 5/2015 | Noll et al. | |
| 2016/0057933 | A1 * | 3/2016 | Van Overschelde | A01D 63/04 56/319 |

FOREIGN PATENT DOCUMENTS

| | | |
|---|---|---|
| EP | 0539745 A1 | 5/1993 |
| EP | 0 539 745 B1 | 4/1995 |
| EP | 1036495 A1 | 9/2000 |
| FR | 2068083 A5 | 8/1971 |

* cited by examiner

TOOL-LESS FOLDING DIVIDER FOR COMBINE HEAD

BACKGROUND OF THE INVENTION

The present invention pertains to agricultural headers and, more specifically, to lateral end dividers for agricultural headers.

An agricultural harvester known as a "combine" is historically termed such because it combines multiple harvesting functions with a single harvesting unit, such as picking, threshing, separating, and cleaning. A combine includes a header which removes the crop from a field and a feeder housing which transports the crop material into a threshing rotor. The threshing rotor rotates within a perforated housing, which may be in the form of adjustable concaves, and performs a threshing operation on the crop to remove the grain. The threshing rotor is provided with rasp bars that interact with the crop material in order to further separate the grain from the crop material, and to provide positive crop movement. Once the grain is threshed, the grain is cleaned using a cleaning system. The cleaning system includes a cleaning fan which blows air through oscillating sieves to discharge chaff and other debris toward the rear of the combine. Non-grain crop material, such as straw, from the threshing section proceeds through a straw chopper and out the rear of the combine. Clean grain is transported to a grain tank onboard the combine.

A typical header generally includes a frame, a pair of end dividers at the lateral ends of the frame, a floor, a cutter to remove crop material from the field, and a conveyor to transport the cut crop material to the feeder housing for further downstream processing in the combine. Generally, the components of a header are specifically optimized to harvest a particular kind of crop. For instance, the header may be in the form of a draper header which is typically used to harvest fluffy or bushy crop such as soy beans or canola. A draper header generally includes a rotating reel assembly with tines, a cutter bar, and a conveyor in the form of one or more draper belts and/or augers. Some draper headers may also move, e.g. lower, raise, roll, pitch, and/or flex, to accommodate the undulating terrain of the field.

To transport a header, the header is typically removed from the combine, positioned on a header-specific transport trailer, and towed lengthwise behind a transport vehicle. Even with transporting the header separately, various components, such as the end dividers, may nevertheless need to be removed in order to reduce the width of the header during transportation. Generally, the removal of the dividers from the header requires the use of tools and a location to store the dividers during transportation of the header. As can be appreciated, removing the dividers may increase the time involved in transporting a header. Furthermore, the removal of the dividers may increase the possibility of the operator forgetting, or otherwise losing, parts of the dividers and/or header during transportation.

What is needed in the art is a cost-effective end divider for a header which can be easily and efficiently transported along with the header.

SUMMARY OF THE INVENTION

In one exemplary embodiment formed in accordance with the present invention, there is provided a foldable end divider for a header. The divider may include an adjustable connector which allows the header to be unfolded in a work position and folded inwardly in a transport position. The adjustable connector includes a first member that mounts a divider body, a second member that is slidably connected to a receiving member on the header, and an articulating joint for allowing the divider body to pivot relative to the header. The adjustable connector is slidable and pivotable relative to the header and remains attached to the header in both the work and transport positions.

In another exemplary embodiment formed in accordance with the present invention, there is provided a divider of a header for an agricultural vehicle. The header includes a frame. The divider includes a divider body, a receiving member configured for being connected to the frame of the header, and an adjustable connector positionable in between an unfolded work position and a folded transport position. The adjustable connector includes a first member, a second member, and an articulating joint for pivotally connecting the first and second members. The first member mounts the divider body, the second member is slidably connected to and received within the receiving member, and the articulating joint is at least partially received within the receiving member in the unfolded work position such that the first and second members are substantially immobilized and the articulating joint is positioned outside of the receiving member in the folded transport position such that the first and second members are movable relative to one another.

In yet another exemplary embodiment formed in accordance with the present invention, there is provided a header for an agricultural vehicle that includes a frame, a receiving member connected to the frame of the header, and at least one divider movably connected to the frame. The at least one divider includes a divider body and an adjustable connector positionable in between an unfolded work position and a folded transport position. The adjustable connector includes a first member, a second member, and an articulating joint for pivotally connecting the first and second members. The first member mounts the divider body, the second member is slidably connected to and received within the receiving member, and the articulating joint is at least partially received within the receiving member in the unfolded work position such that the first and second members are substantially immobilized and the articulating joint is positioned outside of the receiving member in the folded transport position such that the first and second members are movable relative to one another.

In yet another exemplary embodiment formed in accordance with the present invention, there is provided a method for operating a header, including a frame, for an agricultural vehicle. The method includes the initial step of providing a divider that includes a divider body, a receiving member configured for being connected to the frame of the header, and an adjustable connector positionable in between an unfolded work position and a folded transport position. The adjustable connector includes a first member, a second member, and an articulating joint for pivotally connecting the first and second members. The first member mounts the divider body and the second member is slidably connected to and received within the receiving member. The method also includes a step of positioning the adjustable connector in one of: the folded transport position by sliding the adjustable connecter outwardly away from the receiving member such that the articulating joint is positioned outside of the receiving member and the first and second members are movable relative to one another, and folding the first member inwardly for folding the divider body inwardly, and the unfolded work position by unfolding the first member and the second member and sliding the adjustable connecter further within the receiving member such that the articulating joint is at least partially received within the receiving member and the first and second members are substantially immobilized.

One possible advantage of the exemplary embodiment of the agricultural header is that the end dividers may be folded inwardly into a transport position without the need for additional tools.

Another possible advantage of the exemplary embodiment of the agricultural header is that the end dividers remain attached to the header in the work and transport positions.

BRIEF DESCRIPTION OF THE DRAWINGS

For the purpose of illustration, there are shown in the drawings certain embodiments of the present invention. It should be understood, however, that the invention is not limited to the precise arrangements, dimensions, and instruments shown Like numerals indicate like elements throughout the drawings. In the drawings.

DETAILED DESCRIPTION OF THE INVENTION

The terms "forward", "rearward", "left" and "right", when used in connection with the agricultural harvester and/or components thereof are usually determined with reference to the direction of forward operative travel of the harvester, but again, they should not be construed as limiting. The terms "longitudinal" and "transverse" are determined with reference to the fore-and-aft direction of the agricultural harvester and are equally not to be construed as limiting. The terms "downstream" and "upstream" are determined with reference to the intended direction of crop material flow during operation, with "downstream" being analogous to "rearward" and "upstream" being analogous to "forward."

Figure 1:
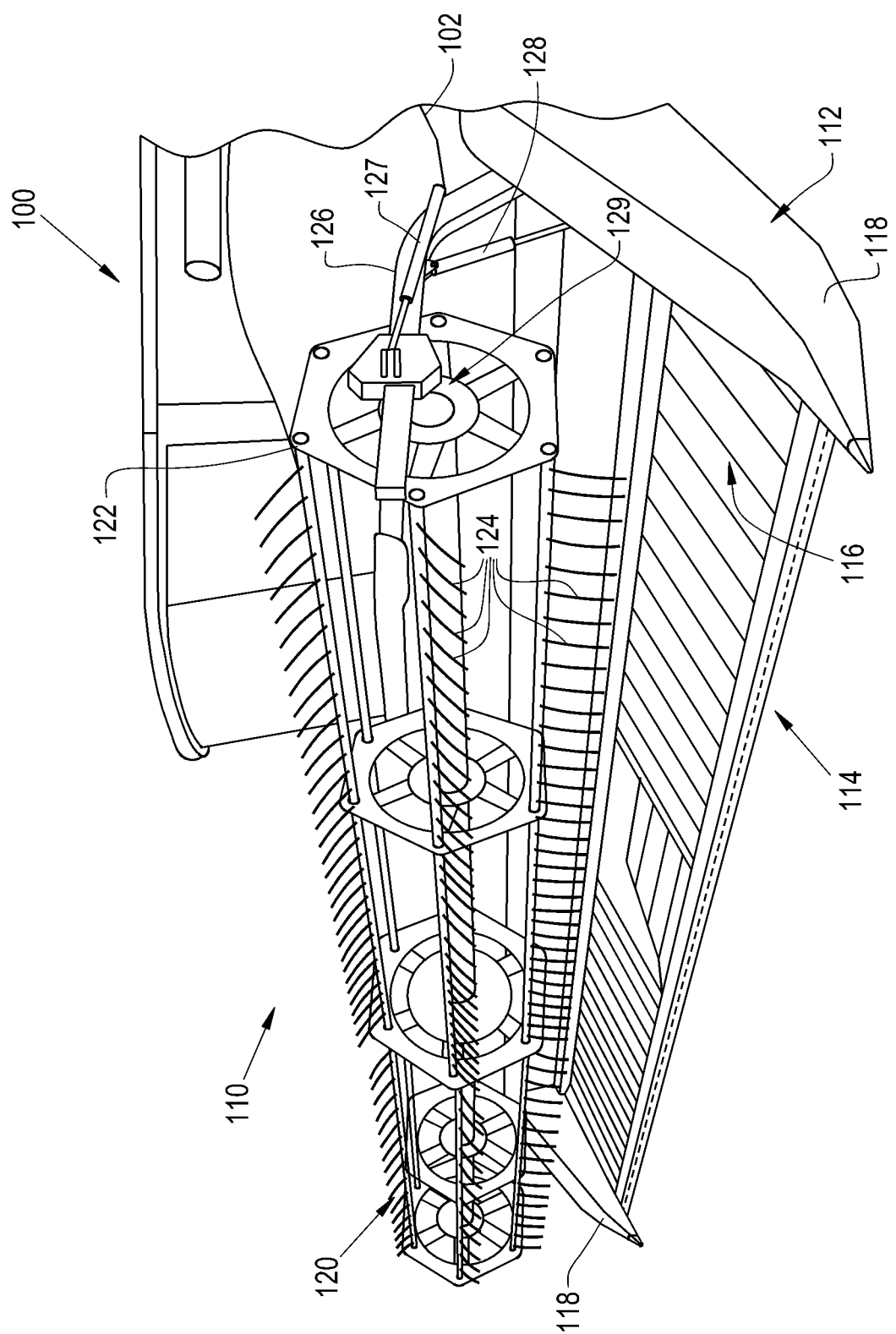
FIG. 1 illustrates a perspective view of a known draper header for an agricultural vehicle.

Referring now to the drawings, and more particularly to FIG. 1, there is shown a known agricultural vehicle 100. The agricultural vehicle 100 is illustrated as a combine 100, which generally includes a chassis 102 supported by wheels, a prime mover, a cab, a feeder housing, and a header 110.

The header 110 is removably attached to the feeder housing. The header 110 is in the form of a draper header 110. The draper header 110 generally includes a frame 112, a cutter bar 114 that severs the crop from a field, at least one conveyor 116, for example a draper belt 116 and/or auger, which feeds the severed crop inwardly toward the feeder housing, a pair of lateral end dividers 118, and a reel assembly 120 mounted to the frame 112, which feeds the crop into the header 110.

The reel assembly 120 generally includes a rotating reel 122 with fingers, e.g. tines 124, a pair of "L"-shaped reel arms 126 mounting the reel 122 to the frame 112, a pair of extension hydraulic cylinders 127, a respective pair of lifting hydraulic cylinders 128, and a reel bearing 129. The reel assembly 120 may also include a reel drive mechanism for rotating the reel. Thereby, the reel 122 may be raised and lowered by the actuators 128 or extended and retracted by the actuators 127. Each reel arm 126 has a proximal, i.e., rear, end and a distal, i.e., front, end. The proximal end of each reel arm 126 is pivotally connected to the frame 112. The reel 122 is movably mounted onto each distal end of the reel arms 126 by way of the reel bearing 129. Each reel arm 126 is a rigid, uniform part that is typically composed of metal.

In order to transport the header 110 along roadways, the header 110 must generally be positioned on a header transport trailer and detached from the agricultural vehicle 100. Then, the header 110 may be towed lengthwise with its longitudinal axis being parallel to the forward direction of travel. Nevertheless, the width of the header 110 in the transport position may still be too great for some roadway requirements. Thereby, the operator generally has to completely remove one or more components from the header 110 to reduce the width of the header 110 in the transport position. For instance, the operator can remove the end dividers 118 to reduce the lateral profile of the header 110. As can be appreciated, it may be undesirable to attach and reattach the end dividers 118 as this process is time consuming and requires separate tools and a place to temporarily store the detached end dividers 118.

Referring now to FIGS. 2-5, there is shown an exemplary embodiment of a header 200, in the form of a draper header 200, which generally includes a frame 202, a cutter bar 204, at least one conveyor 206, and a reel assembly 208. The header 200 may also include at least one foldable crop divider 210, such as a pair of end dividers 210 located at each lateral end of the header 200 (only one shown). Although the header 200 is shown as a draper header 200, it should be appreciated that the end dividers 210 may be incorporated into any desired header 200.

Figure 2:
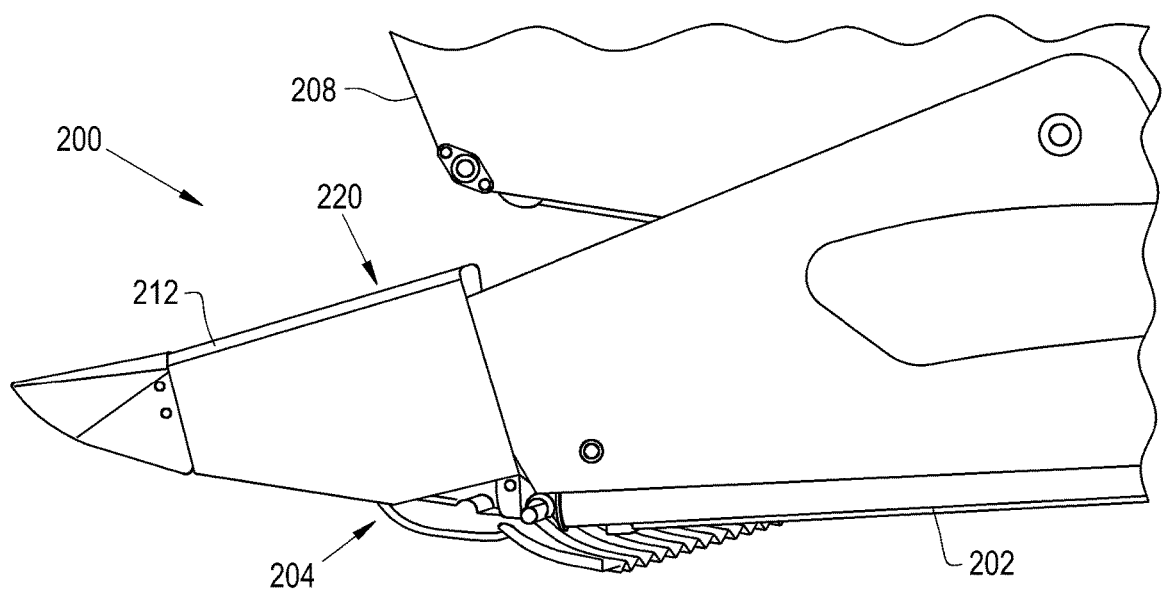
FIG. 2 illustrates a side perspective view of an exemplary embodiment of an agricultural header that includes foldable end dividers in an unfolded work position, in accordance with an exemplary embodiment of the present invention.
Figure 3:
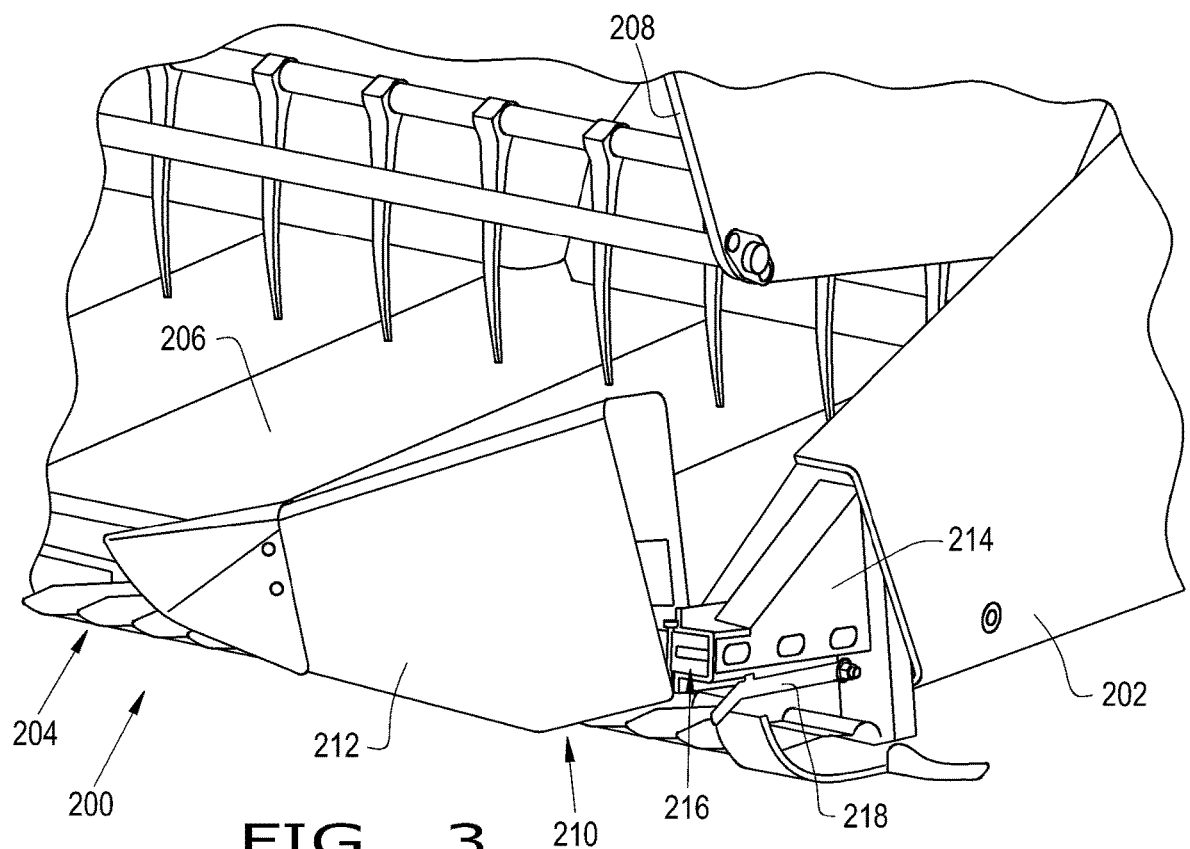
FIG. 3 illustrates a side perspective view of the agricultural header of FIG. 2 in a folded transport position.
Figure 4:
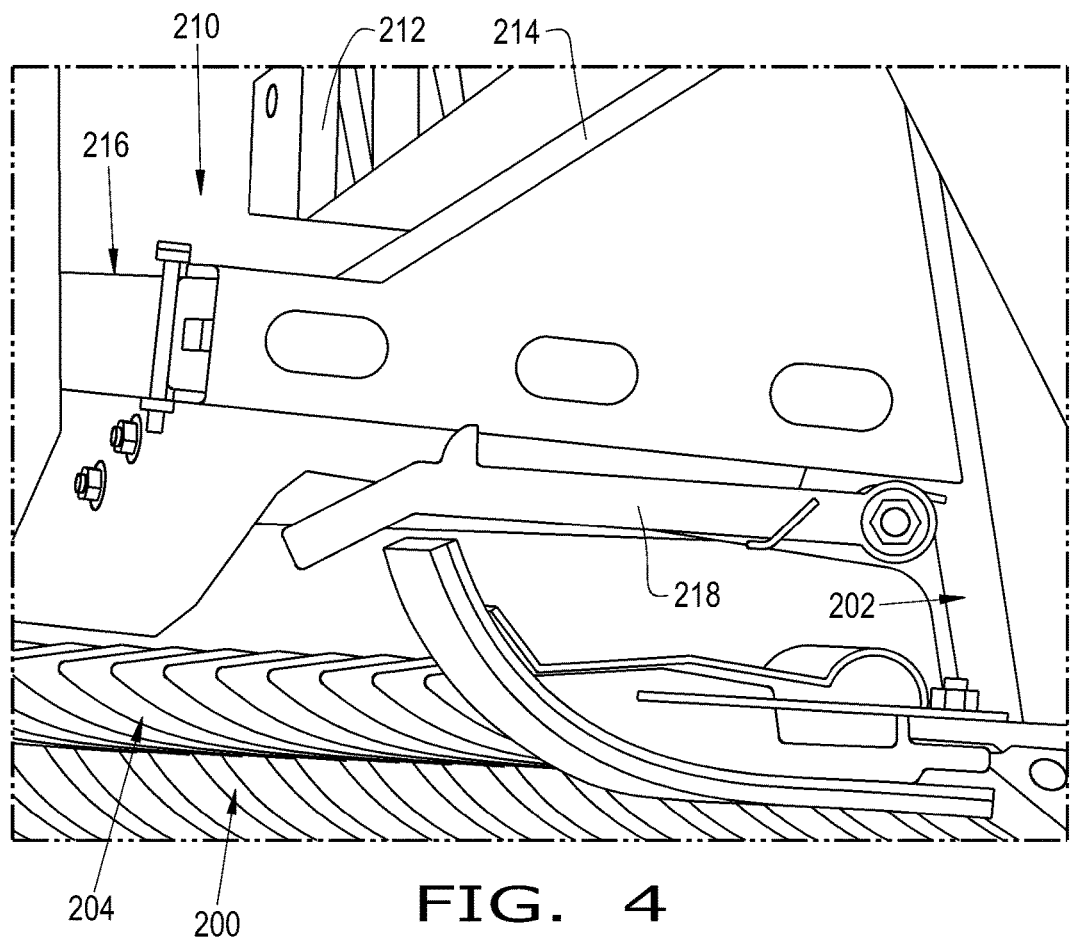
FIG. 4 illustrates a side perspective view of the end divider of FIGS. 2-3 in the transport position.

Each divider 210 may generally include a divider body 212, a receiving member 214 connected to the frame 202, and an adjustable connector 216 (FIG. 3). Each divider 210 is movably connected to the frame 202 such that each divider 210 is foldable between an unfolded work position (FIG. 2) and a folded transport position (FIG. 3). Thereby, the overall profile, i.e., width, of the header 200 may be reduced in the transport position. Each divider 210 may also include a locking member 218 connected to the frame 202 of the header 200 for selectively locking each respective divider 210 in the work and transport positions (FIG. 3).

The divider body 212 is connected to the adjustable connector 216. For example, the divider body 212 may be fastened to the adjustable connector 216 by one or more fasteners. It should be appreciated that the divider body 212 may comprise any desired material and shape. For example, the divider body 212 may comprise a shell body made from sheet metal and a substantially triangular cross-section.

The receiving member 214 mounts the adjustable connector 216 to the header 200. The receiving member 214 may be in the form of a receiving tube 214 which slidably receives the adjustable connector 216. Hence, the receiving tube 214 defines an internal receiving hole for slidably receiving the adjustable connector 216. The receiving tube 214 may also have one or more bottom slots which allow the locking member 218 to pass therethrough and engage with the adjustable connector 216. The receiving member 214 may comprise any desired material and shape. The receiving member 214 may be connected to or incorporated as part of the frame 202 of the header 200. For example, the receiving member 214 may be welded to the frame 202 of the header 200. The receiving member 214 may be a member of a respective divider 210 or a separate member connected to the header 200.

Figure 5:
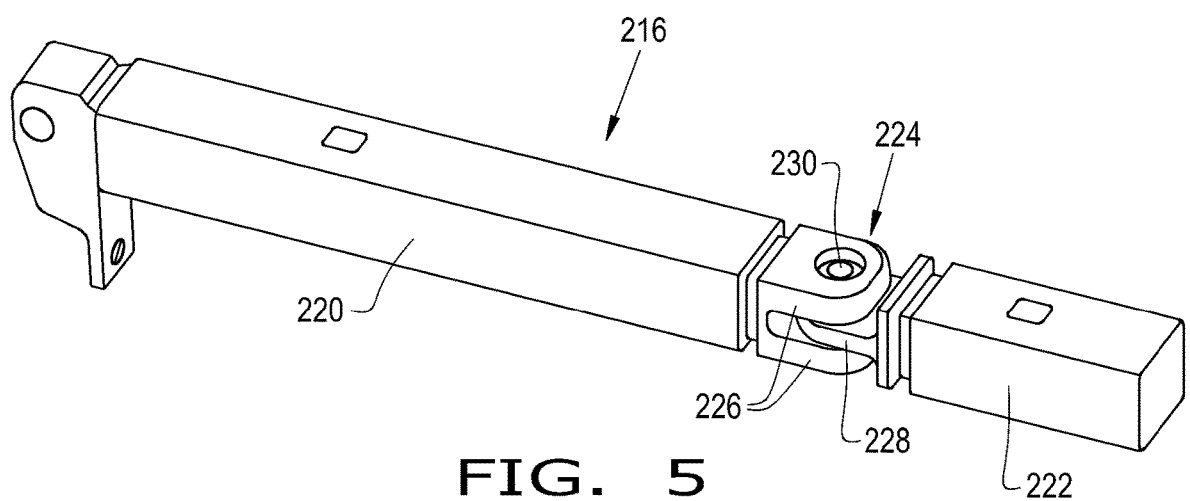
FIG. 5 illustrates a perspective view of an exemplary embodiment of an adjustable connector of the end divider of FIGS. 2-4.

The adjustable connector 216 may slide and pivot relative to the header 200. The adjustable connector 216 may be slidably connected to the receiving member 214 and may also pivot in order to rotate the divider body 212 between the work and transport positions. The adjustable connector 216 may include a first member 220 which mounts the divider body 212, a second member 222 that is slidably connected to and received within the receiving member 214, and an articulating joint 224 for pivotally connecting the first and second members 220, 222 (FIG. 5). The adjustable connector 216 may be positioned in the work position in which the articulating joint 224 is at least partially received within the receiving member 214 and the first and second members 220, 222 are parallel to one another. In the unfolded work position, the first and second members 220, 222 are substantially immobilized and hence the divider 210 becomes rigid and substantially parallel to the forward direction of travel (FIG. 2). As used herein, substantially immobilized may refer to how the first member 220 is restricted from rotating as it contacts the inside perimeter of the receiving member 214, when the articulating joint is at least partially within the receiving member 214. Any movement of the first member 220 in the work position may be negligible and caused by tolerances between the adjustable connector 216 and the receiving member 214. The adjustable connector 216 may also be positioned in the transport position in which the articulating joint 224 is positioned outside of the receiving member 214 such that the first and second members 220, 222 are movable relative to one another and folded to be substantially perpendicular to one another. In the transport position, the divider 210 is not rigid and may be folded inwardly such that it is substantially parallel with the longitudinal axis of the frame 202 (FIG. 3). Hence, as the first member 220 folds inwardly or outwardly, the divider body 212 also folds inwardly or outwardly. The adjustable connector 216 remains connected to the receiving member 214 in the work position and the transport position. The adjustable connector 216 may comprise any desired material and shape.

The first and second members 220, 222 may each include at least one mating protrusion 226, 228 (FIG. 5) which mate, e.g. overlap, with one another and define the articulating joint 224. For example, the first member 220 may include a pair of mating protrusions 226, and the second member 222 may include a single mating protrusion 228 positioned in between the pair of mating protrusions 226 of the first member 220, or vice versa. It is also conceivable for each member 220, 222 to include a single mating protrusion. The mating protrusions 226, 228 may each include a receiving hole for receiving a fastener 230, e.g. a bolt, which defines a pivot axis (FIG. 5). In this regard, the articulating joint 224 is comprised of the mating protrusions 226, 228 and the fastener 230. The first member 220 and the second member 222 of the adjustable connector 216 may be in the form of a mounting tube 220 and a telescoping tube 222 which slides in and out of the receiving member 214. The tubes 220, 222 may be square tubes; however, the first and second members 220, 222 may comprise any desired material and shape, e.g. round, hexagonal, etc. For instance, the first member 220 and/or the second member 222 may have a configuration which is tubular, a solid body, and/or a casting. For example, the first member 220 and/or the second member 222 may each be in the form of an inverted "T"-shaped casting. As can be appreciated, although the articulating joint 224 is designed as part of the divider 210 and the receiving member 214 is attached to the frame 202, this configuration could be switched so that the articulating joint 214 is on the frame 202 and the receiving member 214 is connected to the divider body 212.

The locking member 218 is connected to the frame 202. The locking member 218 selectively engages with the adjustable connector 216 and prevents the adjustable connector 218 from sliding relative to the receiving member 214. For example, the locking member 218 may have one or more protrusions which engage with one or more receiving portions on the second member 222 of the adjustable connector 216. As shown, the locking member 218 is a latch 218 that is pivotally connected to the frame 202, underneath the receiving member 214. The latch 218 may be a spring-loaded latch that is biased to engaged with and apply a locking force with the second member 222 of the adjustable connector 216. Thereby, the latch 218 may automatically lock the adjustable connector 216 in the work position and the operator may pivot the latch 218 downwardly to disengage the latch 218 from the adjustable connector 216 to slide and fold the divider 210 in the transport position. It should be appreciated that the locking member 218 may be in the form of any desired locking member, such as a pin, a clasp, a hook, a fastener, and/or or one or more protrusions or detents.

In operation, the operator of the header 200 may selectively position each divider 210 in the work position or the transport position. To position each divider 210 in the transport position, the operator may disengage the locking member 218 to allow the adjustable connector 216 to slide relative to the receiving member 214. Then, the adjustable connector 216 may be slid outwardly away from the receiving member 214 such that the articulating joint 224 is positioned outside of the receiving member 214 and the first and second members 220, 222 are movable relative to one another. Then, the first member 220 may be folded inwardly to thereby fold the divider body 212 inwardly. To position each divider 210 in the work position, the first and second member 220, 222 may be unfolded and the entire adjustable connecter 216 may be slid inwardly within the receiving member 214 such that the articulating joint 224 is at least partially received within the receiving member 214 and the first and second members 220, 222 are substantially immobilized. The step of positioning the adjustable connector 216 in the work position does not require disengaging the locking member 218 before sliding the adjustable connector 216 within the receiving member 214.

These and other advantages of the present invention will be apparent to those skilled in the art from the foregoing specification. Accordingly, it is to be recognized by those skilled in the art that changes or modifications may be made to the above-described embodiments without departing from the broad inventive concepts of the invention. It is to be understood that this invention is not limited to the particular embodiments described herein, but is intended to include all changes and modifications that are within the scope and spirit of the invention.

The invention claimed is:
1. A divider of a header for an agricultural vehicle, the header comprising a frame, the divider comprising:
    a divider body;
    a receiving member configured for being connected to the frame of the header; and an adjustable connector positionable in between an unfolded work position and a folded transport position, the adjustable connector comprising a first member, a second member, and an articulating joint for pivotally connecting the first and second members, the first member mounts the divider body, the second member is slidably connected to and received within the receiving member, and the articulating joint is at least partially received within the receiving member in the unfolded work position such that the first and second members are substantially immobilized without a resilient member urging the receiving member over the articulating joint and the articulating joint is positioned outside of the receiving member in the folded transport position such that the first and second members are movable relative to one another.

2. The divider of claim 1, wherein the adjustable connector remains connected to the receiving member in the unfolded work position and the folded transport position, and the first member folds inwardly for folding the divider body inwardly in the folded transport position.

3. The divider of claim 1, further comprising a locking member configured for being connected to the frame of the header, and the locking member selectively engages with the adjustable connector and prevents the adjustable connector from sliding.

4. The divider of claim 3, wherein the locking member is in the form of a latch that is configured for being pivotally connected to the frame of the header.

5. The divider of claim 1, wherein the first member comprises at least one mating protrusion and the second member comprises at least one mating protrusion configured for mating with the at least one mating protrusion of the first member.

6. The divider of claim 5, wherein the first member comprises a pair of mating protrusions and the second member comprises a single mating protrusion positioned in between the pair of mating protrusions of the first member.

7. The divider of claim 5, wherein the at least one mating protrusion of the first member and the at least one protrusion of the second member overlap with one another.

8. The divider of claim 7, further comprising a fastener, wherein the at least one mating protrusion of the first member and the at least one mating protrusion of the second member each comprise a receiving hole for receiving the fastener, and the articulating joint is comprised of the at least one mating protrusion of the first member, the at least one mating protrusion of the second member, and the fastener.

9. The divider of claim 1, wherein the receiving member is a receiving tube, the first member is a mounting tube pivotally connected by way of the articulating joint to the second member, and the second member is a telescoping tube which slides relative to the receiving tube.

10. A header for an agricultural vehicle, comprising:
a frame;
a receiving member connected to the frame of the header; and
at least one divider movably connected to the frame, the at least one divider comprising:
a divider body; and
an adjustable connector positionable in between an unfolded work position and a folded transport position, the adjustable connector comprising a first member, a second member, and an articulating joint for pivotally connecting the first and second members, the first member mounts the divider body, the second member is slidably connected to and received within the receiving member, and the articulating joint is at least partially received within the receiving member in the unfolded work position such that the first and second members are substantially immobilized without a resilient member urging the receiving member over the articulating joint and the articulating joint is positioned outside of the receiving member in the folded transport position such that the first and second members are movable relative to one another.

11. The header of claim 10, wherein the adjustable connector remains connected to the receiving member in the unfolded work position and the folded transport position, and the first member folds inwardly for folding the divider body inwardly in the folded transport position.

12. The header of claim 10, further comprising a locking member connected to the frame of the header, and the locking member selectively engages with the adjustable connector and prevents the adjustable connector from sliding.

13. The header of claim 12, wherein the locking member is in the form of a latch that is pivotally connected to the frame of the header.

14. The header of claim 10, wherein the first member comprises at least one mating protrusion and the second member comprises at least one mating protrusion configured for mating with the at least one mating protrusion of the first member.

15. The header of claim 14, wherein the first member comprises a pair of mating protrusions and the second member comprises a single mating protrusion positioned in between the pair of mating protrusions of the first member.

16. The header of claim 14, wherein the at least one mating protrusion of the first member and the at least one protrusion of the second member overlap with one another.

17. The header of claim 16, further comprising a fastener, wherein the at least one mating protrusion of the first member and the at least one mating protrusion of the second member each comprise a receiving hole for receiving the fastener, and the articulating joint is comprised of the at least one mating protrusion of the first member, the at least one mating protrusion of the second member, and the fastener.

18. A method for operating a header comprising a frame for an agricultural vehicle, comprising:
providing a divider comprising a divider body, a receiving member configured for being connected to the frame of the header, and an adjustable connector positionable in between an unfolded work position and a folded transport position, the adjustable connector comprising a first member, a second member, and an articulating joint for pivotally connecting the first and second members, the first member mounts the divider body, the second member is slidably connected to and received within the receiving member; and
positioning the adjustable connector in one of:
the folded transport position by sliding the adjustable connecter outwardly away from the receiving member such that the articulating joint is positioned outside of the receiving member and the first and second members are movable relative to one another, and folding the first member inwardly for folding the divider body inwardly; and
the unfolded work position by unfolding the first member and the second member and sliding the adjustable connecter further within the receiving member such that the articulating joint is at least partially received within the receiving member and the first and second members are substantially immobilized without a resilient member urging the receiving member over the articulating joint.

19. The method of claim 18, wherein the divider further comprises a locking member configured for being connected to the frame of the header, and the locking member selectively engages with the adjustable connector and prevents the adjustable connector from sliding, and the step of positioning the adjustable connector in the folded transport position further comprises disengaging the locking member before sliding the adjustable connector.

20. The method of claim 18, wherein the divider further comprises a locking member configured for being connected to the frame of the header, and the locking member selectively engages with the adjustable connector and prevents the adjustable connector from sliding, and the step of positioning the adjustable connector in the unfolded transport position does not require disengaging the locking member before sliding the adjustable connector.

\* \* \* \* \*